United States Patent
Deeba et al.

(10) Patent No.: US 8,568,675 B2
(45) Date of Patent: Oct. 29, 2013

(54) PALLADIUM-SUPPORTED CATALYST COMPOSITES

(75) Inventors: Michel Deeba, East Brunswick, NJ (US); Tian Luo, Piscataway, NJ (US); Josephine Ramos, Piscataway, NJ (US)

(73) Assignee: BASF Corporation, Florham Park, NJ (US)

( * ) Notice: Subject to any disclaimer, the term of this patent is extended or adjusted under 35 U.S.C. 154(b) by 402 days.

(21) Appl. No.: 12/707,416

(22) Filed: Feb. 17, 2010

(65) Prior Publication Data

US 2010/0212293 A1 Aug. 26, 2010

Related U.S. Application Data

(60) Provisional application No. 61/154,154, filed on Feb. 20, 2009, provisional application No. 61/155,757, filed on Feb. 26, 2009.

(51) Int. Cl.
*B01J 23/00* (2006.01)
*B01J 21/00* (2006.01)
*B01J 8/02* (2006.01)
*B01D 50/00* (2006.01)
*B01D 53/56* (2006.01)
*B01D 53/94* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)

(52) U.S. Cl.
USPC ........ 423/213.5; 422/177; 422/180; 502/302; 502/303; 502/304; 502/326; 502/332; 502/333; 502/339; 502/349; 502/355; 502/415; 502/439; 502/527.12; 502/527.13

(58) Field of Classification Search
USPC ......... 502/302–304, 326, 332, 333, 339, 349, 502/355, 415, 439, 527.12, 527.13; 423/213.5; 422/177, 180
See application file for complete search history.

(56) References Cited

U.S. PATENT DOCUMENTS 5,000,929 A 3/1991 Horiuchi et al.
5,057,483 A 10/1991 Wan
(Continued)

FOREIGN PATENT DOCUMENTS

EP 0488347 A1 6/1992
EP 1712278 A1 10/2006
(Continued)

*Primary Examiner* — Cam N. Nguyen
(74) *Attorney, Agent, or Firm* — Melanie L. Brown (57) ABSTRACT

Provided are catalyst composites that can be used in methods for treating exhaust gas from internal combustion engines, including diesel and gasoline engines, systems including such catalyst composites and methods of using the catalyst composites to treat internal combustion engine exhaust. The catalyst composites may provide diesel oxidation catalysts and three-way catalysts. A catalyst composite is provided which a catalytic material on a carrier, the catalytic material including a palladium component dispersed on a first support comprising at least 60% by weight of a zirconia component, and one or more rare earth oxides selected from the group consisting of lanthana, neodymia, praseodymia, yttria, the first support optionally containing no more than 15% by weight ceria, and being free of alumina. Layered catalyst composites having one or more washcoats on the carrier are also provided.

23 Claims, 5 Drawing Sheets

(56) References Cited

U.S. PATENT DOCUMENTS

| | | | |
|---|---|---|---|
| 5,597,771 A * | 1/1997 | Hu et al. | 502/304 |
| 5,888,464 A * | 3/1999 | Wu et al. | 423/213.5 |
| 5,898,014 A * | 4/1999 | Wu et al. | 502/302 |
| 5,948,377 A * | 9/1999 | Sung | 423/213.5 |
| 5,948,723 A * | 9/1999 | Sung | 502/303 |
| 6,087,298 A * | 7/2000 | Sung et al. | 502/333 |
| 6,248,688 B1 * | 6/2001 | Wu et al. | 502/302 |
| 6,326,329 B1 * | 12/2001 | Nunan | 502/242 |
| 6,335,305 B1 | 1/2002 | Suzuki et al. | |
| 6,375,910 B1 * | 4/2002 | Deeba et al. | 423/239.1 |
| 6,492,287 B1 * | 12/2002 | Srinivasan | 442/401 |
| 6,569,392 B1 * | 5/2003 | Li et al. | 423/213.5 |
| 6,602,479 B2 | 8/2003 | Taniguchi et al. | |
| 6,764,665 B2 * | 7/2004 | Deeba et al. | 423/239.1 |
| 6,777,370 B2 * | 8/2004 | Chen | 502/241 |
| 6,921,738 B2 | 7/2005 | Hwang et al. | |
| 7,094,730 B2 * | 8/2006 | LaBarge et al. | 502/332 |
| 7,374,729 B2 * | 5/2008 | Chen et al. | 422/177 |
| 7,501,098 B2 * | 3/2009 | Chen et al. | 422/177 |
| 7,517,510 B2 * | 4/2009 | Chen et al. | 423/213.2 |
| 7,550,124 B2 * | 6/2009 | Chen et al. | 423/213.2 |
| 7,622,096 B2 * | 11/2009 | Deeba et al. | 423/213.2 |
| 7,674,743 B2 * | 3/2010 | Gandhi et al. | 502/302 |
| 7,749,472 B2 * | 7/2010 | Chen et al. | 423/213.2 |
| 7,754,171 B2 * | 7/2010 | Chen et al. | 423/213.2 |
| 7,758,834 B2 * | 7/2010 | Chen et al. | 423/213.2 |
| 7,795,172 B2 * | 9/2010 | Foong et al. | 502/327 |
| 7,879,755 B2 * | 2/2011 | Wassermann et al. | 502/304 |
| 8,007,750 B2 * | 8/2011 | Chen et al. | 423/239.1 |
| 8,026,193 B2 * | 9/2011 | Miura | 502/304 |
| 8,038,951 B2 * | 10/2011 | Wassermann et al. | 422/168 |
| 8,067,330 B2 * | 11/2011 | Suzuki et al. | 502/302 |
| 8,080,494 B2 * | 12/2011 | Yasuda et al. | 502/327 |
| 8,097,553 B2 * | 1/2012 | Miura et al. | 502/304 |
| 2001/0036432 A1 * | 11/2001 | Hu et al. | 423/213.5 |
| 2002/0048542 A1 * | 4/2002 | Deeba et al. | 423/239.1 |
| 2002/0131914 A1 * | 9/2002 | Sung | 422/177 |
| 2003/0039597 A1 * | 2/2003 | Deeba et al. | 422/177 |
| 2003/0061860 A1 * | 4/2003 | Hu et al. | 73/23.31 |
| 2003/0083194 A1 * | 5/2003 | Sung | 502/304 |
| 2004/0198595 A1 * | 10/2004 | Chen | 502/328 |
| 2005/0081443 A1 * | 4/2005 | Aiello et al. | 48/198.3 |
| 2006/0057046 A1 * | 3/2006 | Punke et al. | 423/215.5 |
| 2007/0134145 A1 * | 6/2007 | Strehlau et al. | 423/213.5 |
| 2007/0179054 A1 * | 8/2007 | Akamine et al. | 502/304 |
| 2008/0020925 A1 | 1/2008 | Larcher et al. | |
| 2008/0044330 A1 * | 2/2008 | Chen et al. | 423/213.5 |
| 2008/0187476 A1 | 8/2008 | Larcher et al. | |
| 2008/0207438 A1 * | 8/2008 | Suzuki et al. | 502/302 |
| 2009/0042722 A1 * | 2/2009 | Hu et al. | 502/304 |
| 2009/0175773 A1 * | 7/2009 | Chen et al. | 423/213.5 |

FOREIGN PATENT DOCUMENTS

| | | |
|---|---|---|
| EP | 1810738 A1 | 7/2007 |
| WO | 2009023468 A2 | 2/2009 |

\* cited by examiner

PALLADIUM-SUPPORTED CATALYST COMPOSITES

CROSS REFERENCE TO RELATED APPLICATIONS

This application claims the benefit of priority under 35 USC §119(e) to U.S. Provisional Application Ser. No. 61/154,154, filed Feb. 20, 2009 and U.S. Provisional Application Ser. No. 61/155,757, filed Feb. 26, 2009, both of which are incorporated herein by reference.

TECHNICAL FIELD

This pertains to catalyst composites and catalytic articles used to treat gaseous streams containing hydrocarbons and carbon monoxide. More specifically, aspects of the invention are directed to catalyst composites and systems that contain precious metals dispersed on zirconia-based supports, and to methods of using and making such composites.

BACKGROUND

Various catalysts have been proposed for purifying the exhaust gas emitted from internal combustion engines by reducing harmful components contained in the exhaust gas such as hydrocarbons (HC), nitrogen oxides (NOx) and carbon monoxide (CO).

Catalyst composites comprising a precious metal dispersed on one or more refractory metal oxide supports are known for use in treating the exhaust of internal combustion engines to reduce nitrogen oxides, hydrocarbons and carbon monoxide gaseous pollutants. Such catalyst composites have been generally contained in units such as honeycomb monolithic carriers, and the catalyst composites are called catalytic converters or catalyzers, which are placed in the exhaust flow path from internal combustion engine systems to treat the exhaust before it vents to the atmosphere. Typically, the catalyst composites are formed on ceramic or metallic substrate carriers (such as the flow-through honeycomb monolith carrier, as described herein below) upon which one or more catalyst coating compositions are deposited.

Platinum (Pt) is an effective metal for oxidizing CO and HC after high temperature aging. Despite the lower cost of Pd compared to Pt, Pd-based catalyst composites typically show higher light-off temperatures for oxidation of CO and HC, potentially causing a delay in HC and/or CO light-off. "Light-off" temperature for a specific component is the temperature at which 50% of that component reacts. Despite the lower cost of palladium as compared to platinum, Pd-containing catalyst composites may poison the activity of Pt to convert hydrocarbons and/or oxidize $NO_x$ and may also make the catalyst composite more susceptible to sulfur poisoning when used in diesel engine exhaust systems. These characteristics have typically prevented the use of Pd as catalyst composites in lean burn operations, especially for light duty diesel applications where engine temperatures remain below 250° C. for most driving conditions.

When palladium is used as the precious metal in the catalyst composite, alumina commonly used as the Pd support in treating emissions from both gasoline and diesel internal combustion engines. In addition, zirconia has been used as a palladium support, however, a significant loss of zirconia surface area has prevented the widespread use of zirconia supports for this purpose. Such supports suffer from lack of hydrothermal stability. There is an ongoing need to improve the performance of such catalysts, and an improvement of 5% reduction in residual hydrocarbons, carbon monoxide and nitrogen oxides is considered an excellent performance improvement.

As emissions regulations become more stringent, there is a continuing goal to develop catalyst composites that provide improved performance, for example, light-off performance and removal of residual hydrocarbons, carbon monoxide and NOx. There is also a goal to utilize components, for example, palladium, as efficiently as possible.

SUMMARY

Provided are catalyst composites that can be used in methods for treating exhaust gas from internal combustion engines, including diesel and gasoline engines, systems including such catalyst composites and methods of using the catalyst composites to treat internal combustion engine exhaust. The catalyst composites may provide diesel oxidation catalysts and three-way catalysts.

In a first embodiment of the invention, provided is a catalyst composite comprising: a catalytic material on a carrier, the catalytic material including a palladium component dispersed on a first support comprising at least 60% by weight of a zirconia component, and one or more rare earth oxides selected from the group consisting of lanthana, neodymia, praseodymia, yttria, the first support optionally containing no more than 15% by weight ceria, and being free of alumina. In detailed variants on the first embodiment, the zirconia component can be present in the support in amounts by weight of at least 65%, 70%, 75%, 80%, 85%, 90%, 95%, or even 99%. In detailed embodiments, other precious metals, such as Pt, are not included in the catalytic material.

Another detailed variant of the first embodiment, the ceria present in the support in an amount by weight that is no more than 15%, 14%, 13%, 12%, 11%, 10%, 9%, 8%, 7%, 6%, 5%, 4%, 3%, 2%, 1% or even 0.5%. Being "free of alumina" means that there is no alumina intentionally included in the washcoat used to prepare the catalytic material. In other embodiments, the zirconia component can be present in the support in an amount by weight in the range of 60 to 90%, 65 to 89%, 70 to 87%, 75 to 85%, or even 78 to 82%; the yttria can be present in the support in an amount by weight in the range of 5 to 15%, 6 to 14%, 7.5 to 12.5%, or even 9 to 11%; the praseodymia can be present in the support in an amount by weight in the range of 5 to 15%, 6 to 14%, 7.5 to 12.5%, or even 9 to 11%; the lanthana can be present in the support in an amount by weight in the range of 2 to 10%, 2 to 5%, 2.5 to 4.5%, or even 3 to 4%; and the neodymia can optionally be present in the support in an amount by weight in the range of 0.01 to 10%, 0.5 to 10%, 2 to 10%, 3 to 9%, 4 to 8%, or even 5 to 7%.

Layered catalyst composites can be provided according to one or more embodiments of the invention. A variety of layered catalyst composite designs are within the scope of the present invention. For example, a first layer may contain Pd, while an overlayer may contain Rh or Pd/Rh. In one variant, the Pd layer may be the first layer while the Rh or Pd/Rh layer may be the overlayer. A sandwich structure may be provided in which a Pd layer is disposed between layers containing Rh (or Pd/Rh), or an Rh Layer is disposed between layers containing Pd. In each of the above designs, an undercoat may be provided underneath the first layer such that the undercoat is a bottom layer. In other designs, the first layer is the bottom layer. The undercoat may contain alumina alone, or alumina and an OSC such as ceria, zirconia, praseodymia and combinations thereof. In a specific embodiment, each of the washcoat layers includes only the precious metals described with respect to each layer, and no other precious metals (e.g., Pt, Ru, Ag, etc) are included in each of the washcoat layers. Thus, in specific embodiments, each washcoat layer includes only Pd or Pd/Rh, with no other precious metals being present in the washcoat layers.

In a second embodiment, the first support comprises at least 70% by weight of the zirconia component and an amount of up to 20% by weight one or more rare earth oxides selected from the group consisting of lanthana, neodymia, praseodymia, and yttria. In a third embodiment, the first support comprises: zirconia in an amount in the range of 60 to 90 weight %; yttria in an amount in the range of 5 to 15 weight %; praseodymia in an amount in the range of 5 to 15 weight %; lanthana in an amount in the range of 2 to 10 weight %; and optionally containing neodymia in an amount in the range of 2 to 10% by weight.

In a fourth embodiment, the first support comprises zirconia in an amount in the range of 75 to 85 weight %; lanthana in an amount in the range of 2 to 5 weight %; yttria in an amount in the range of 7.5 to 12.5 weight %; and praseodymia in an amount in the range of 7.5 to 12.5 weight %.

In any of the embodiments described above, the palladium component is present in the catalytic material in an amount in the range of 0.25 to 0.75 weight %. In any of the embodiments, the palladium component can be present in any of the following ranges: 0.25 to 7 weight percent, in specific embodiments 0.25 to 1 weight percent, 1 to 3 weight percent or 3 to 7 weight percent. In any of the embodiments described above, the Pd loading is in the range of 15 to 200 g/ft$^3$, and in specific embodiments, the Pd loading can be 15 to 40 g/ft$^3$, 15 to 100 g/ft$^3$, 40 to 100 g/ft$^3$, or 100 to 200 g/ft$^3$.

The catalyst composites described above provide improved HC, CO, NOx conversion as compared to a comparative catalytic material comprising a palladium component on an alumina support. In addition, the catalyst composites described above provide improved methane conversion as compared to a comparative catalytic material comprising a palladium component on an alumina support.

Any of the catalyst composites described above can be provided in a washcoat structure. In a fifth embodiment, the catalytic material and the palladium component dispersed on the first support are contained in a first washcoat layer on the carrier; and the catalyst composite further comprises a second washcoat layer comprising a rhodium component dispersed on a second support comprising alumina. In a sixth embodiment, the second washcoat layer further comprises Pd on a third support comprising at least 60% by weight of a zirconia component, and one or more rare earth oxides selected from the group consisting of lanthana, neodymia, praseodymia, the second support optionally containing no more than 15% by weight ceria, and being free of alumina.

In a variant on the fifth and sixth embodiments, the second washcoat layer is disposed over the first washcoat layer. In another variant of the fifth and sixth embodiment, the first washcoat layer is disposed over the second washcoat layer.

In a seventh embodiment, the fifth embodiment further comprises a third washcoat layer comprising Pd on a fourth support comprising at least 60% by weight of a zirconia component, and one or more rare earth oxides selected from the group consisting of lanthana, neodymia, praseodymia, the second support optionally containing no more than 15% by weight ceria, and being free of alumina, wherein the second washcoat layer is disposed between the first washcoat layer and third washcoat layer.

In an eighth embodiment, the fifth embodiment further comprises a third washcoat layer comprising Rh on a fourth support comprising alumina, wherein the first washcoat layer is disposed between the second washcoat layer and third washcoat layer.

In a variant, any of the waschoat layer embodiment described above may further comprise an undercoat layer comprising alumina. In yet another variant, the undercoat layer further comprising ceria, praseodymia, zirconia, and combinations thereof.

Another aspect provides a method of treating a gaseous exhaust stream of a diesel engine, the exhaust stream including hydrocarbons, carbon monoxide, and other exhaust gas components, the method comprising: contacting the exhaust stream with the diesel oxidation catalyst composites according to embodiments of the invention.

A further aspect provides a system for treatment of a diesel engine exhaust stream including hydrocarbons, carbon monoxide, and other exhaust gas components, the emission treatment system comprising: an exhaust conduit in fluid communication with the diesel engine via an exhaust manifold; the diesel oxidation catalyst composite according to embodiments of the invention wherein the carrier is a flow through substrate or a wall-flow substrate; and one or more of the following in fluid communication with the composite: a soot filter, a selective catalytic reduction (SCR) catalytic article and a NOx storage and reduction (NSR) catalytic article.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Provided are diesel exhaust systems and components where palladium is supported by a zirconia material containing one or more of lanthana, neodymia, praseodymia, yttria, and optionally ceria. The zirconia-based support materials in accordance with this invention used to support palladium, with different incorporated rare earth metal oxides and combinations that showed improved hydrothermal stability, higher Pd dispersion, and improved HC oxidation and NOx reduction activities as compared to palladium supported on alumina. The composite materials are made mainly of zirconia, at least 60% by weight, and can be modified by rare earth oxides of lanthana (La), yttrium (Y), praseodymium (Pr), neodymium (Nd), and optionally cerium (Ce).

Reference to a catalyst composite means a catalytic article including a carrier substrate, for example a honeycomb carrier substrate, having a catalytic material on the honeycomb carrier substrate. In specific embodiments, the catalytic material may be contained in one or more washcoat layers containing a catalytic material made of one or more catalytic components, for example, a precious group metal component that is effective to catalyze the oxidation of HC, CO and/or $NO_x$.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%).

Reference to OSC (oxygen storage component) refers to an entity that has multi-valence state and can store and release molecular oxygen under exhaust conditions. Typically, an oxygen storage component will comprise one or more reducible oxides of one or more rare earth metals. Examples of suitable oxygen storage components include ceria, zirconia and combinations thereof. Praseodymia can also be included as an OSC or a promoter. The OSC may include one or more promoters or modifiers, such as Y, La, Nd, Sm, Pr, and combinations thereof.

High surface refractory metal oxide supports, such as alumina, refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2$ g. The loading on the refractory oxide support is preferably from about 0.1 to about 6 $g/in^3$, more preferably from about 2 to about 5 $g/in^3$ and most preferably from about 3 to about 4 $g/in^3$.

Reference to "impregnated" means that a precious metal-containing solution is put into pores of a material such as a support. Reference to "dispersed" means that a precious-metal containing solution is on the surface of a support, may include some impregnation of the solution. In detailed embodiments, dispersion of precious metals is achieved by incipient wetness. Incipient wetness dispersion tends to lead to a substantially uniform distribution of the solution of the precursor throughout the pore system of the material. Other methods of adding precious metal are also known in the art and can be used.

Details of the components of a gas treatment article and system according to embodiments of the invention are provided below.

The Carrier

According to one or more embodiments, the carrier may be any of those materials typically used for preparing three way catalysts (TWC) and diesel oxidation catalysts (DOC) and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc.

The porous wall flow filter used according to embodiments of the present invention is optionally catalyzed in that the wall of said element has thereon or contained therein one or more catalytic materials to provide a catalyzed soot filter (CSF), and such CSF compositions are described herein. Catalytic materials may be present on the inlet side of the element wall alone, the outlet side alone, both the inlet and outlet sides, or within the wall itself may consist all, or in part, of the catalytic material. In another embodiment, this invention may include the use of one or more washcoat layers of catalytic materials and combinations of one or more layers of catalytic materials on the inlet and/or outlet walls of the element.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The carriers useful for the catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

For a catalyzed soot filter, the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Specific wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Specific ceramic wall flow substrates used in the system can be formed of a material having a porosity of at least 40% (e.g., from 40 to 70%) having a mean pore size of at least 5 microns (e.g., from 5 to 30 microns). In more specific embodiments, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. Suitable wall flow substrates are for example disclosed in U.S. Pat. No. 4,329,162.

Preparation of Catalyst Composites

The catalyst composites of the present invention may be formed in a single layer or multiple layers. In some instances, it may be suitable to prepare one slurry of catalytic material and use this slurry to form multiple layers on the carrier. The composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage therethrough of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a monolithic carrier. For a first layer of a specific washcoat, finely divided particles of a support such as zirconia are slurried in an appropriate vehicle, e.g., water. The carrier may then be dipped one or more times in such slurry or the slurry may be coated on the carrier such that there will be deposited on the carrier the desired loading of the support, e.g., about 0.5 to about 2.5 g/in$^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 400-600° C. for about 10 minutes to about 3 hours. Typically, when palladium is desired, the palladium component is utilized in the form of a compound or complex to achieve dispersion of the component on the support, e.g., zirconia. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the support particles does not adversely react with the support or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or tetraammine palladium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound) and at least one support, such as a zirconia component, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds or stabilizers, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt %, more particularly about 30-40 wt %.

Additional layers, i.e., second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference.

Diesel Engine Exhaust Gas Systems

As noted above, the catalyst composites according to the present invention can be used in three-way catalysts for gasoline engine exhaust gas treatment systems or DOCs for diesel engine exhaust gas treatments systems. The diesel oxidation catalyst (DOC) composite of the present invention can be used in an integrated emission treatment system comprising one or more additional components for the treatment of diesel exhaust gas emissions. For example, the emission treatment system may further comprise a catalyzed soot filter (CSF) component and/or a selective catalytic reduction (SCR) catalytic article. The diesel oxidation catalyst can be located upstream or downstream from the soot filter and/or selective catalytic reduction component.

In addition to treating the exhaust gas emissions via use of an oxidation catalyst, the present invention may employ a soot filter for removal of particulate matter. The soot filter may be located upstream or downstream from the DOC, but typically, the soot filter will be located downstream from the diesel oxidation catalyst. In one embodiment, the soot filter is a catalyzed soot filter (CSF). The CSF may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with a one or more high surface area refractory oxides (e.g., a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Other wall flow filter substrates are composed of ceramic-like materials such as cordierite, $\alpha$-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

The exhaust gas treatment system of the present invention may further comprise a selective catalytic reduction (SCR) component. The SCR component may be located upstream or downstream of the DOC and/or soot filter. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations. The system may further include a NOx storage and release (NSR) catalytic article. In certain embodiments, one or the other of an SCR or NSR catalytic article is included in the system.

The DOC catalyst compositions disclosed herein may be useful as stable close-coupled catalysts. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures.

Specific embodiments according to the present invention will now be described in the following examples. The examples are illustrative only, and are not intended to limit the remainder of the disclosure in any way. Although the instant specification places emphasis on oxidation in a diesel engine, the oxidation catalysts described herein are useful for other catalytic reactions, such as oxidation of CO and hydrocarbons in gasoline engines.

EXAMPLES

The following non-limiting examples shall serve to illustrate the various embodiments of the present invention. In each of the examples, the carrier was cordierite.

Example 1

Powder Catalyst Preparation

Comparative Samples A and B and Samples C through H 0.5 wt % Pd supported on a series of $ZrO_2$ based materials, and $Al_2O_3$ reference materials were prepared by impregnation of a measured amount of $Pd(NO_3)_2$ solution (27.6% Pd) on to 50 g of each of the raw materials. The Pd nitrate was diluted in water to reach incipient wetness of each material. The diluted palladium nitrate solution was added drop wise over the powder while mixing. The powder was then dried and calcined at 550° C. for 2 h.

Table 1 shows the list of the samples: The composite materials according to one or more embodiments of the invention were made mainly of $ZrO_2$ and modified with other rare-earth oxides such as La, Nd, Pr, Ce, Y, and their combinations.

TABLE 1

| Comparative A | 0.5% Pd supported on 8% $BaO/Al_2O_3$ |
|---|---|
| Comparative B | 0.5% Pd supported on 4% $La_2O_3$ on $Al_2O_3$ |
| Sample C | 0.5% Pd |
| Sample D | 0.5% Pd |
| Sample E | 0.5% Pd |

TABLE 1-continued

| Sample F | 0.5% Pd |
| Sample G | 0.5% Pd |
| Sample H | 0.5% Pd |

The composition of each of the support used for each of Comparative Samples A and B and Samples C—H are shown in Table 2.

TABLE 2

|   | $Al_2O_3$ | $CeO_2$ | $ZrO_2$ | $La_2O_3$ | $Nd_2O_3$ | $Pr_6O_{11}$ | $Y_2O_3$ |
|---|---|---|---|---|---|---|---|
| Comparative A | 92 |   | 8 |   |   |   |   |
| Comparative B | 96 |   | 4 |   |   |   |   |
| Sample C |   |   | 88.8 |   |   | 10.2 |   |
| Sample D |   |   | 79.9 |   |   | 10 | 10.1 |
| Sample E |   |   | 79.9 | 3.82 | 8.1 |   | 8.18 |
| Sample F |   | 10 | 75 | 2 | 5 |   | 8 |
| Sample G |   | 10 | 68 | 2 | 5 |   | 15 |
| Sample H |   |   | 79.7 | 4 |   | 8.2 | 8.1 |

Example 2

Aging and Lab Reactor Testing

Aging Conditions: All powders were oven aged in air at 1050° C. for 12 hours before evaluation in a lab reactor Lab Reactor Testing Conditions: A lab reactor testing was used to measure the performance of the aged Pd supported on alumina and the $ZrO_2$ based materials. The reactor used about 30-50 mg of material. Equal volume of aged catalysts was used to achieve a similar Gas Hourly Space Velocity of about 120,000/h.

Aged powder samples were submitted for three types of reactions:

Test 1. CO+NO+Steam. This reaction measures effectiveness of the Pd on $ZrO_2$ type materials compared to Pd on alumina.
NO=1250 ppm, CO=2250 ppm, $H_2O$=5%, balanced in He Test 2. Model gas reaction at slightly rich condition: This reaction mimics rich conditions in Gasoline Vehicle testing. In this reaction we studied the propylene and methane oxidation activities over reference Pd on alumina and Pd on experimental $ZrO_2$ composite materials.

| (ppm) | $CH_4$ | $C_3H_6$ | CO | NO | $O^2$ | Lambda |
|---|---|---|---|---|---|---|
| Rich | 1000 | 300 | 7500 | 1500 | 4000 | 0.988 |

Test 3. Model gas reaction at slightly lean condition: This reaction mimics lean conditions in Gasoline Vehicle testing.

| (ppm) | $CH_4$ | $C_3H_6$ | CO | NO | $O_2$ | Lambda |
|---|---|---|---|---|---|---|
| Lean | 1000 | 300 | 7500 | 1500 | 12000 | 1.026 |

Figure 1:
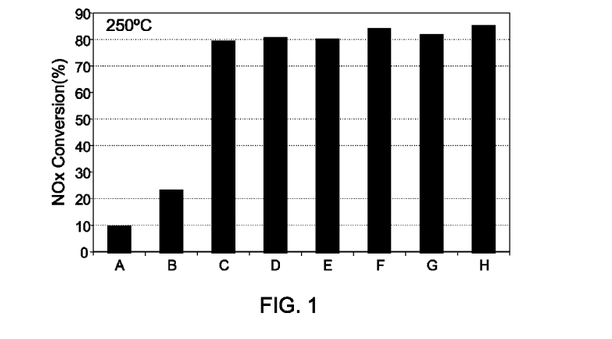
FIG. 1 is a graph showing the results of the CO+NO+steam reaction testing and the NOx conversion at 250° C. for various samples.

FIG. 1 shows the results of the CO+NO+steam reaction testing and the NOx conversion at 250° C. As FIG. 1 shows, the NOx conversion for each of Samples C—H were at least about 80% or higher, whereas the alumina-supported materials only exhibited NOx conversion of less than 25%.

Figure 2:
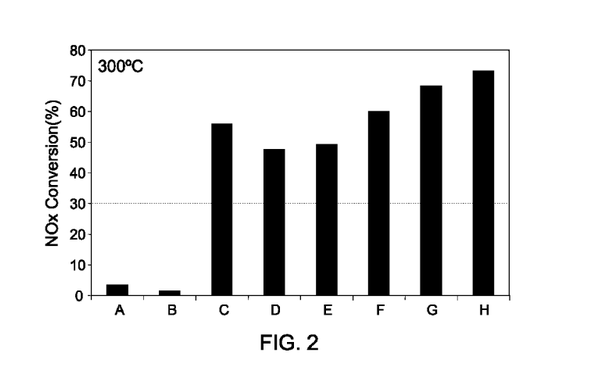
FIG. 2 is a graph showing the results of NOx conversion measured at 300° C. for various samples.

FIG. 2 shows the results of NOx conversion measured at 300° C.: Significantly higher NOx conversion were achieved for Pd supported on $ZrO_2$ based materials compared to reference Pd supported on alumina materials. The $ZrO_2$ based materials showed NOx conversion over 50% compared to less than 10% NOx conversion for 0.5% Pd supported on alumina. This significant enhancement in NOx conversion over Pd/$ZrO_2$ will result in improving the NOx light off temperature in gasoline vehicles during cold start. FIG. 2 shows NOx conversion over experimental materials compared to alumina reference materials. The NOx conversion was measured using model gas reaction (slightly rich condition) at several temperatures.

Example 3

Propylene and Methane Conversion Tests

Figure 3:
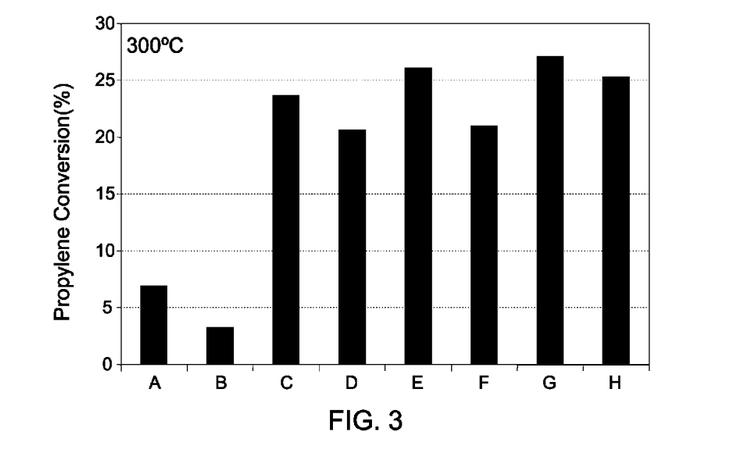
FIG. 3 is a graph showing the results of propylene conversion measured at 300° C. for various samples.

Propylene Conversion activity: This reaction mimics slightly rich conditions in gasoline vehicle testing. In this reaction the propylene and methane oxidation activities were studied for reference Pd on alumina and Pd on experimental $ZrO_2$ composite materials. The hydrocarbon conversion was measured using this Model gas reaction (see conditions below). The results of propylene conversion measured at 300° C., shown in FIG. 3, show that significantly higher propylene conversion was achieved for Pd supported on $ZrO_2$ based materials compared to reference Pd supported on alumina materials. The $ZrO_2$ based materials showed propylene conversion over 20% compared to less than 10% propylene conversion for 0.5% Pd supported on reference alumina. This significant enhancement in propylene conversion over Pd/$ZrO_2$ will result in improving the hydrocarbon light off activity in gasoline vehicles during cold start.

| (ppm) | $CH_4$ | $C_3H_6$ | CO | NO | $O_2$ | Lambda |
|---|---|---|---|---|---|---|
| Rich | 1000 | 300 | 7500 | 1500 | 4000 | 0.988 |

Figure 4:
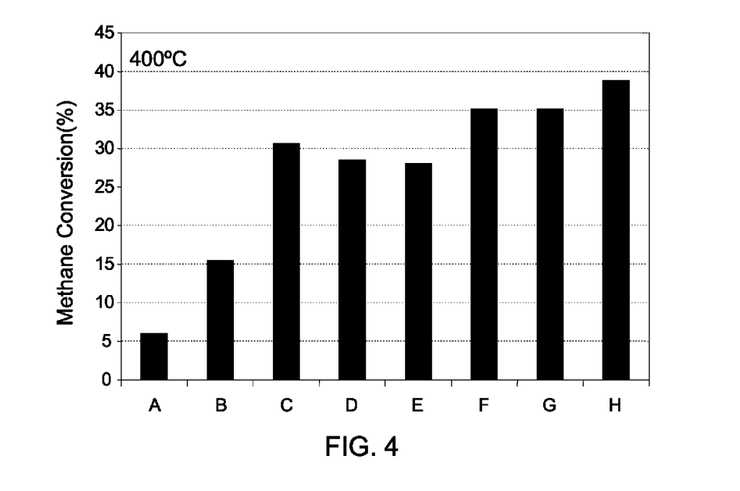
FIG. 4 is a graph showing the results of methane conversion measured at 400° C. for various samples.
Figure 6:
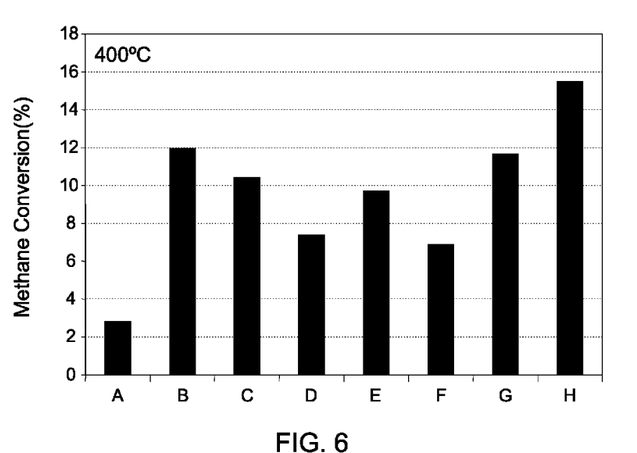
FIG. 6 is a graph showing the results of methane conversion measured at 400° C. for various samples.

Methane Conversion activity: Methane is one of most difficult hydrocarbons to oxidize. As shown in FIG. 6, the methane conversion is more than twice observed for Pd on alumina. This is very significant for removing methane from different application including DOCs and Homogeneous Charge Compression Ignition (HCCI) type applications. FIG. 4 shows that a significant improvement in methane conversion activity was achieved using $ZrO_2$ composite Pd supports compared to reference Pd supported on alumina. Conversions for Pd on alumina supports were only 15% and as low as about 5%, whereas for Zr supports, conversions exceeded 25%, 30% and 35%.

Example 4

Model Gas Testing at Slightly Lean Conditions

Figure 5:
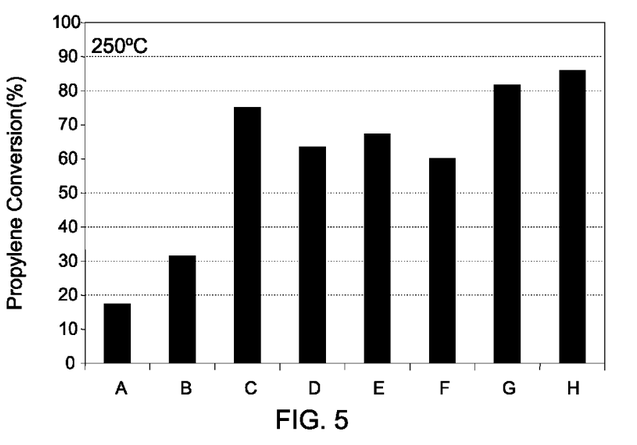
FIG. 5 is a graph showing the results of propylene conversion measured at 250° C. for various samples.

This study was performed at slightly lean conditions which may be representative of certain transient in gasoline vehicle testing. The results shown in FIG. 5 clearly show the advantage of the Pd supported on $ZrO_2$ composite materials compared to that of Pd supported on alumina reference materials. The propylene conversion under lean conditions showed over 60% propylene conversion activity compared to Pd on reference alumina at about 30% or lower. These results indicate that the Zr-based support materials are very useful in gasoline three-way catalyst applications.

Example 5

Characterization of Stabilized $ZrO_2$ Materials

While not intending the present invention to be limited by a particular theory, it is believed that the main reason for the significant enhancement in NOx and hydrocarbon activity of the catalysts according to the present invention is the surface area stabilization compared with pure $ZrO_2$ supports and better Pd dispersion compared to alumina supports. It is believed that the most effective elements for stabilization are Pr and Y or their combinations.

Figure 7:
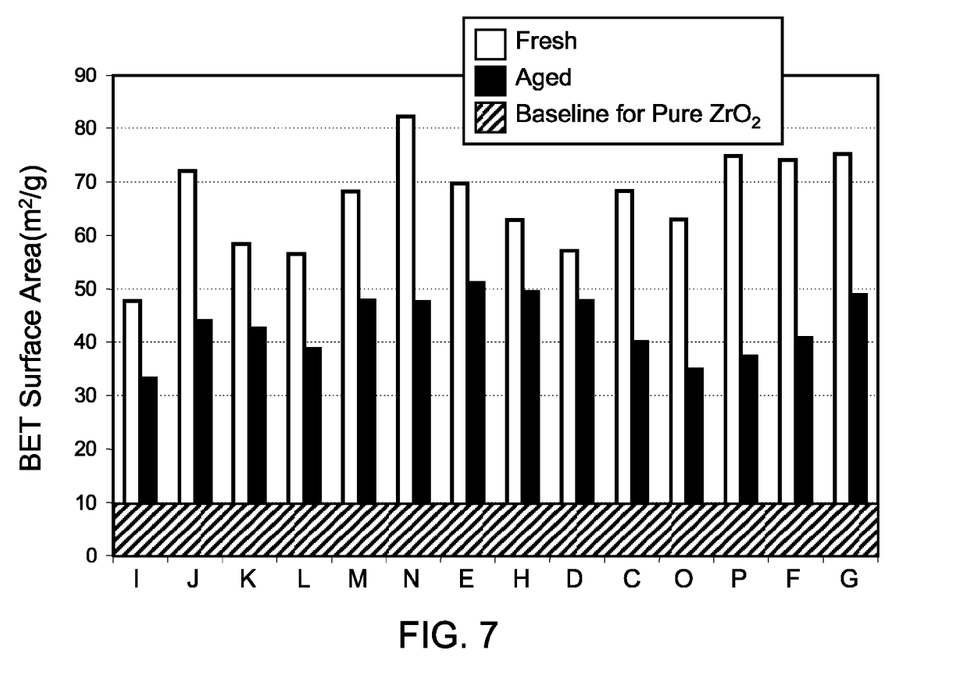
FIG. 7 is a graph showing the enhancement in surface area of the supports according to embodiments of the present invention compared to pure $ZrO_2$.

FIG. 7 shows the enhancement in surface area of the supports according to the present invention compared to pure $ZrO_2$. Pure $ZrO_2$ supports exhibited a surface area of less than about 10 $m^2/g$ for samples aged at 800° C. at 12 hours in 10% steam, compare with at least 30 $m^2/g$ for the supports in accordance with the present invention. The inventive samples were aged at 1000° C. for four hours. Note that pure $ZrO_2$ samples degraded severely when aged above 800° C.

Figure 8:
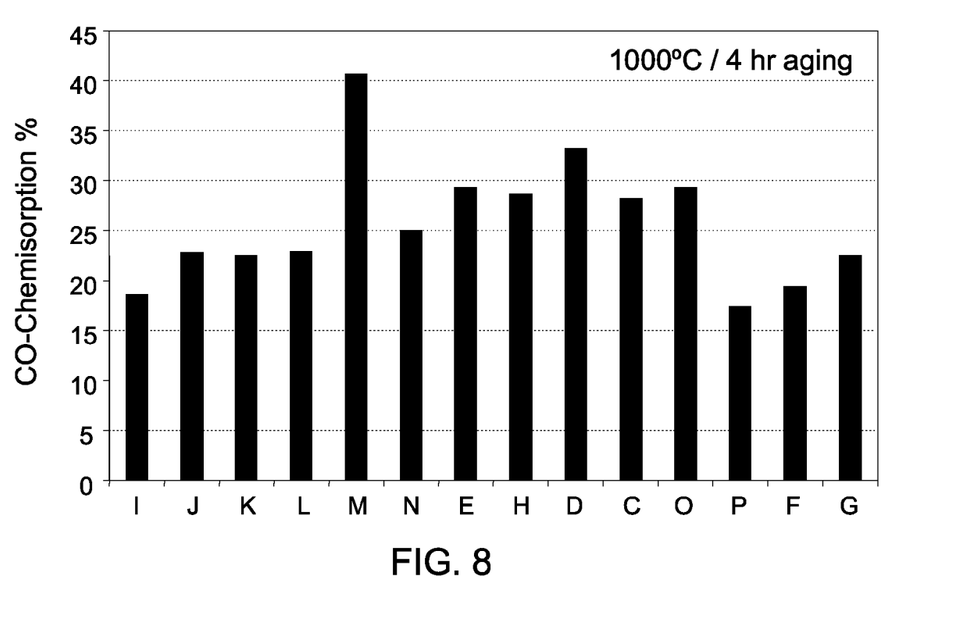
FIG. 8 is a graph showing the enhancement in Pd dispersion on supports according to embodiments of the present invention.

CO Chemisorption testing: 0.5% Pd supported on Samples A through P, after 1000° C./4 hr aging. Each of the samples were pretreated in 7% $H_2$/He at 450° C. After aging at 1000° C. for 4 hours, CO chemisorption tests were performed, which is indicative of Pd dispersion, is at least three times higher for the $ZrO_2$ composites compared to Pd on alumina. Specifically, FIG. 8 shows the enhancement in Pd dispersion on supports of the present invention, all of which were at least about 15% or higher. Some samples were higher than 20%, 25%, 30%, 35%, and 40%. Pd dispersion for a 0.5% Pd supported on stabilized alumina supports, after 1000° C./4 hr aging resulted single digit values.

Figure 9:
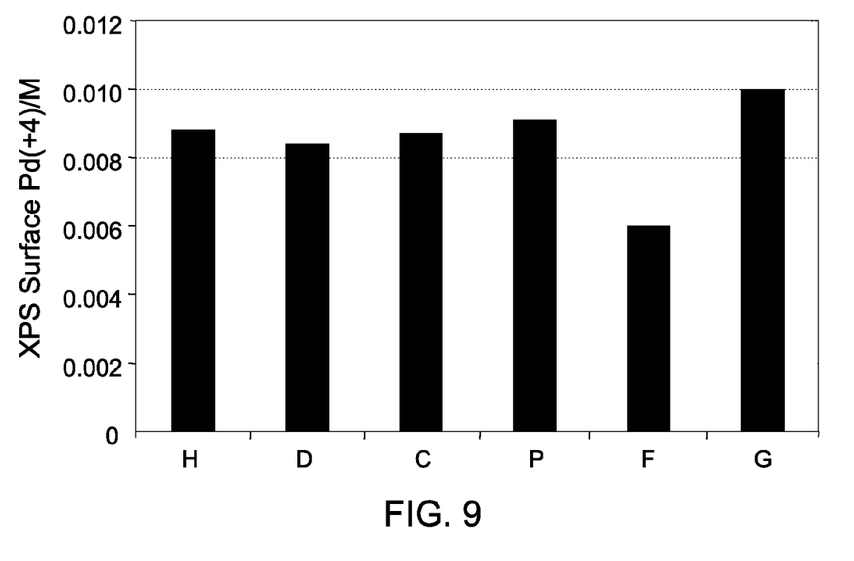
FIG. 9 is a graph showing X-ray Photoelectron Spectroscopy (XPS) data for various samples.

XPS Results of Aged $ZrO_2$ Composites:

X-ray Photoelectron Spectroscopy (XPS) of 0.5 wt % Pd supported on Samples C through P, after 1000° C./4 hr aging was performed. FIG. 9 shows that XPS of $ZrO_2$ composites with Pr and Y fair better after aging than other composites, as evidenced by the presence of $Pd^{+4}$. In all cases where Pd was detected, PR, Y and Ce or there combination were also present. Assuming the ability to detect Pd by XPS is relate to Pd dispersion, this suggests that Pr, Y and optionally Ce, or their combination, better stabilizes the support for supporting Pd than the other composites.

Example 6

Preparation of Layered Catalyst Composites Comparative Composite Sample Q (Reference Catalyst Composite A two layered catalyst with Pd bottom coat and Pd/Rh top coat was prepared using methods as described above. 0.14 wt. % of Pd was distributed onto an alumina support containing 20% zirconia and on a zirconia oxygen storage material (OSC-1) support containing 40-45% $CeO_2$. The alumina and OSC-1 were mixed together and impregnated with Pd nitrate. The impregnated material was then calcined at 550° C. for 2 hours. The 0.14 wt. % Pd on the alumina and OSC-1 support were then mixed with water and the pH was lowered to 4.5 using zirconium nitrate and nitric acid. The slurry was then milled to about 90% less than 10 microns. The slurry was then coated onto substrate to a washcoat loading of about 1 $g/in^3$.

A top coat for Comparative Composite Sample Q was prepared as follows: A Pd slurry for the top coat was prepared by impregnating 0.0281 wt. % Pd on support. The Pd on support was then calcined at 550° C. for 2 hours. The Pd portion was then added to water to make slurry. The pH of the Pd portion of the slurry was then reduced to 4-4.5. A Rh slurry for the topcoat was prepared by making a 0.0038 wt. % Rh impregnated alumina support and OSC-1 support (at a ratio of 1:2). The impregnated powder was then added to water containing mono-ethanol solution. The pH was then reduced to 4-5 using nitric acid, The Pd and Rh slurries were milled to a 90% less than 10 microns. The Pd/Rh slurry was then coated as a second layer over the Bottom Pd layer at a washcoat loading of about 2 $g/in^3$. The coated catalyst was then dried and calcined at 550° C. for 2 h.

Composite Samples R through U-Layered Catalyst Composites

The same procedures were used as above for Comparative Composite Sample Q, with equal concentration of Pd and Rh distributed as in Comparative Composite Sample Q, but replacing the standard alumina in bottom and top coats by materials based on the following:

Composite Sample R: Support of Sample F
Composite Sample S: Support of Sample L
Composite Sample T: Support of Sample C
Composite Sample U: Support of Sample D The Rh supports as well as their ratios remained the same for Composite Samples R through U.

Example 7

Lab Reactor Testing of Composite Samples

Lab reactor testing was performed using simulated gas exhaust in a transient reactor which can simulate FTP cycle, where gas composition and space velocity varies along the test to simulate real vehicle testing conditions. The catalysts were aged at 950° C. for 16 hours before evaluation. The HC, CO, and NO residuals after catalyst were measured. In the table below, lower residual percentage numbers indicates higher conversion. The percentage reduction is based upon the reduction compared to Comparative Composite Sample Q, which indicates the percent improvement in reduction of HC, CO and NOx. As shown in Table 3, the reduction in HC using the inventive supports in a layered catalyst composite structure resulted in a significant reduction in HC, CO and NOx, particularly for HC and NOx, which exhibited greater than 20% reduction compared to Comparative Composite Sample Q. As noted above, a 5% improvement in reduction is seen as excellent, and these results are indicative of a material that is superior for reduction of HC, CO and NOx in a variety of internal combustion engine applications.

TABLE 3

| Sample | Residual HC % | Percentage HC Reduction | Residual CO % | Percentage CO Reduction | Residual NOx % | Percentage NOx reduction |
|---|---|---|---|---|---|---|
| Q | 8.1 | — | 18.5 | — | 14.4 | — |
| R | 6.4 | 21% | 16.6 | 10.3% | 10.8 | 25% |
| S | 6.3 | 22.2% | 17.2 | 7% | 11.5 | 20.1% |

TABLE 3-continued

| Sample | Residual HC % | Percentage HC Reduction | Residual CO % | Percentage CO Reduction | Residual NOx % | Percentage NOx reduction |
|---|---|---|---|---|---|---|
| T | 6.9 | 14.8% | 17.9 | 3.2% | 11.8 | 18.1% |
| U | 6.2 | 23.5% | 17.1 | 7/6% | 10.5 | 27.1% |

Figure 10:
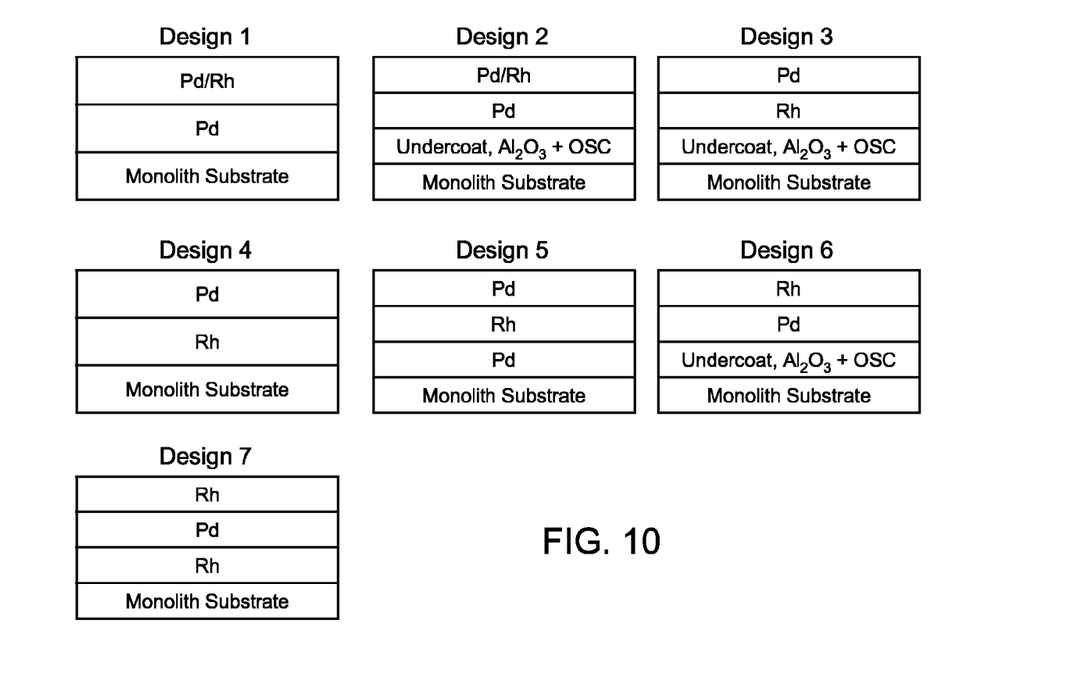
FIG. 10 is a schematic view showing examples of a various coating architectures according to embodiments of the invention.

A variety of layered catalyst composite designs are within the scope of the present invention. For example, a first layer may contain Pd, while an overlayer may contain Rh or Pd/Rh. In one variant, the Pd layer may be the first layer while the Rh or Pd/Rh layer may be the overlayer. A sandwich structure may be provided in which a Pd layer is disposed between layers containing Rh (or Pd/Rh). In each of the above designs, an undercoat may be provided underneath the first layer such that the undercoat is a bottom layer. In other designs, the first layer is the bottom layer. The undercoat may contain alumina alone, or alumina and an OSC such as ceria, zirconia, praseodymia and combinations thereof. FIG. 10 shows examples of a few different coating architectures. In Design 1 shown in FIG. 10, a Pd layer is disposed on the substrate, and a Pd/Rh layer is on the Pd layer. In Design 2, an undercoat, which may comprise alumina with or without an OSC is provided under Design 1. In Designs 3 and 4, a Pd layer is provided over a Rh layer, with Design 3 including an optional undercoat that may include alumina and an optional OSC. In Design 5, a sandwich type design is shown in which a Pd layer is disposed on the substrate, with an Rh layer over the Pd layer, and a top layer comprising a Pd layer. In Design 6, an undercoat layer is provided on the substrate, which can include alumina and an optional OSC component, and a Pd layer over the undercoat and an Rh layer over the Pd layer. In Design 7, an Rh layer is disposed on the substrate, and a Pd layer is disposed on the Rh layer, and a second Pd layer is disposed over the Rh layer. In each of designs 5 and 7, and undercoat layer may be utilized.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An engine exhaust gas catalyst composite comprising:
a catalytic material on a carrier, the catalytic material including a palladium component dispersed on a first support comprising at least 60% by weight of a zirconia component, and one or more rare earth oxides selected from the group consisting of lanthana, neodymia, praseodymia, and yttria, the first support optionally containing no more than 15% by weight ceria, and being free of alumina.

2. The catalyst composite of claim 1, wherein the first support comprises at least 70% by weight of the zirconia component and an amount of up to 20% by weight one or more rare earth oxides selected from the group consisting of lanthana, neodymia, praseodymia, and yttria.

3. The catalyst composite of claim 1, wherein the first support comprises:
zirconia in an amount in the range of 60 to 90 weight %;
yttria in an amount in the range of 5 to 15 weight %;
praseodymia in an amount in the range of 5 to 15 weight %;
lanthana in an amount in the range of 2 to 10 weight %; and
optionally containing neodymia in an amount in the range of 2 to 10% by weight.

4. The catalyst composite of claim 3, wherein the first support comprises:
zirconia in an amount in the range of 75 to 85 weight %;
lanthana in an amount in the range of 2 to 5 weight %;
yttria in an amount in the range of 7.5 to 12.5 weight %; and
praseodymia in an amount in the range of 7.5 to 12.5 weight %.

5. The catalyst composite of claim 1, wherein the palladium component is present in the catalytic material in an amount in the range of 15 to 100 g/ft$^3$.

6. The catalyst composite of claim 1 providing improved HC, CO, NOx conversion as compared to a comparative catalytic material comprising a palladium component on an alumina support.

7. The catalyst composite of claim 1 providing improved methane conversion as compared to a comparative catalytic material comprising a palladium component on an alumina support.

8. The catalyst composite of claim 1, wherein the catalytic material is contained in a first washcoat layer on the carrier; and
the catalyst composite further comprises a second washcoat layer comprising a rhodium component dispersed on a second support comprising alumina.

9. The catalyst composite of claim 8, the second washcoat layer further comprises Pd on a third support comprising at least 60% by weight of a zirconia component, and one or more rare earth oxides selected from the group consisting of lanthana, neodymia, and praseodymia, the second support optionally containing no more than 15% by weight ceria, and being free of alumina.

10. The catalyst composite of claim 9, wherein the second washcoat layer is disposed over the first washcoat layer.

11. The catalyst composite of claim 9, wherein the first washcoat layer is disposed over the second washcoat layer.

12. A method of treating a gaseous exhaust stream of a diesel engine, the exhaust stream including hydrocarbons, carbon monoxide, and other exhaust gas components, the method comprising: contacting the exhaust stream with a diesel oxidation catalyst comprising engine exhaust gas catalyst composite of claim 9.

13. A system for treatment of a diesel engine exhaust stream including hydrocarbons, carbon monoxide, and other exhaust gas components, the system comprising:

an exhaust conduit in fluid communication with the diesel engine via an exhaust manifold;

a diesel oxidation catalyst comprising engine exhaust gas catalyst composite of claim 9 wherein the carrier is a flow through substrate or a wall-flow substrate ; and one or more of the following in fluid communication with the composite: a soot filter, a selective catalytic reduction (SCR) catalytic article and a NOx storage and reduction (NSR) catalytic article.

14. The catalyst composite of claim 8, further comprising a third washcoat layer comprising Pd on a fourth support comprising at least 60% by weight of a zirconia component, and one or more rare earth oxides selected from the group consisting of lanthana, neodymia, and praseodymia, the second support optionally containing no more than 15% by weight ceria, and being free of alumina, wherein the second washcoat layer is disposed between the first washcoat layer and third washcoat layer.

15. The catalyst composite of claim 8, further comprising a third washcoat layer comprising Rh on a fourth support comprising alumina, wherein the first washcoat layer is disposed between the second washcoat layer and third washcoat layer.

16. A method of treating a gaseous exhaust stream of a diesel engine, the exhaust stream including hydrocarbons, carbon monoxide, and other exhaust gas components, the method comprising: contacting the exhaust stream with a diesel oxidation catalyst comprising engine exhaust gas catalyst composite of claim 15.

17. A system for treatment of a diesel engine exhaust stream including hydrocarbons, carbon monoxide, and other exhaust gas components, the system comprising:

an exhaust conduit in fluid communication with the diesel engine via an exhaust manifold;

a diesel oxidation catalyst comprising engine exhaust gas catalyst composite of claim 15 wherein the carrier is a flow through substrate or a wall-flow substrate ; and one or more of the following in fluid communication with the composite: a soot filter, a selective catalytic reduction (SCR) catalytic article and a NOx storage and reduction (NSR) catalytic article.

18. The catalyst composite of claim 8, further comprising an undercoat layer comprising alumina.

19. The catalyst composite of claim 18, the undercoat layer further comprising ceria, praseodymia, zirconia, and combinations thereof.

20. A method of treating a gaseous exhaust stream of a diesel engine, the exhaust stream including hydrocarbons, carbon monoxide, and other exhaust gas components, the method comprising: contacting the exhaust stream with a diesel oxidation catalyst comprising engine exhaust gas catalyst composite of claim 18.

21. A system for treatment of a diesel engine exhaust stream including hydrocarbons, carbon monoxide, and other exhaust gas components, the system comprising:

an exhaust conduit in fluid communication with the diesel engine via an exhaust manifold;

a diesel oxidation catalyst comprising engine exhaust gas catalyst composite of claim 18 wherein the carrier is a flow through substrate or a wall-flow substrate ; and one or more of the following in fluid communication with the composite: a soot filter, a selective catalytic reduction (SCR) catalytic article and a NOx storage and reduction (NSR) catalytic article.

22. A method of treating a gaseous exhaust stream of a diesel engine, the exhaust stream including hydrocarbons, carbon monoxide, and other exhaust gas components, the method comprising: contacting the exhaust stream with a diesel oxidation catalyst comprising engine exhaust gas catalyst composite of claim 1.

23. A system for treatment of a diesel engine exhaust stream including hydrocarbons, carbon monoxide, and other exhaust gas components, the system comprising:

an exhaust conduit in fluid communication with the diesel engine via an exhaust manifold;

a diesel oxidation catalyst comprising engine exhaust gas catalyst composite of claim 1 wherein the carrier is a flow through substrate or a wall-flow substrate ; and one or more of the following in fluid communication with the composite: a soot filter, a selective catalytic reduction (SCR) catalytic article and a NOx storage and reduction (NSR) catalytic article.

* * * * *